US006626632B2

United States Patent
Guenzi et al.

(10) Patent No.: US 6,626,632 B2
(45) Date of Patent: Sep. 30, 2003

(54) ROBOTIC ORDER PICKING SYSTEM

(75) Inventors: Richard Dale Guenzi, Lebanon, OH (US); Mark Stephen Feie, Lebanon, OH (US)

(73) Assignee: Motoman, Inc., West Carrollton, OH (US)

(*) Notice: Subject to any disclaimer, the term of this patent is extended or adjusted under 35 U.S.C. 154(b) by 0 days.

(21) Appl. No.: 09/729,997

(22) Filed: Dec. 4, 2000

(65) Prior Publication Data

US 2002/0067984 A1 Jun. 6, 2002

Related U.S. Application Data

(60) Provisional application No. 60/168,923, filed on Dec. 3, 1999.

(51) Int. Cl.[7] .............................................. B65G 1/137
(52) U.S. Cl. ..................................... 414/789.6; 414/799
(58) Field of Search ............................. 414/799, 789.6, 414/788.5; 901/7

(56) References Cited

U.S. PATENT DOCUMENTS

| | | | | |
|---|---|---|---|---|
| 3,888,362 A | * | 6/1975 | Fletcher et al. ............. 214/1 B |
| 4,588,349 A | | 5/1986 | Reuter | |
| 4,692,876 A | | 9/1987 | Tenma et al. | |
| 4,783,904 A | * | 11/1988 | Kimura ........................ 29/786 |
| 4,850,783 A | * | 7/1989 | Maekawa ................ 414/792.9 |
| RE33,416 E | | 10/1990 | Konishi et al. | |
| 4,976,584 A | * | 12/1990 | Focke ..................... 414/789.6 |
| 5,211,528 A | * | 5/1993 | Kato ........................ 414/789.6 |
| 5,269,646 A | * | 12/1993 | Focke ....................... 414/796.2 |
| 5,281,081 A | | 1/1994 | Kato | |
| 5,293,322 A | | 3/1994 | Yagi et al. | |
| 5,297,924 A | * | 3/1994 | Neri et al. ................... 414/799 |
| 5,372,472 A | * | 12/1994 | Winski et al. ............... 414/786 |
| 5,501,571 A | | 3/1996 | Van Durrett et al. | |
| 5,733,098 A | | 3/1998 | Lyon et al. | |
| 5,868,545 A | | 2/1999 | Kasai et al. | |
| 5,900,105 A | | 5/1999 | Toshima | |
| 5,901,830 A | * | 5/1999 | Kalm et al. ............ 198/370.06 |
| 5,934,864 A | | 8/1999 | Lyon et al. | |
| 5,953,234 A | | 9/1999 | Singer et al. | |
| 5,963,918 A | | 10/1999 | Reagan et al. | |
| 5,996,316 A | | 12/1999 | Kirschner | |
| 6,238,173 B1 | * | 5/2001 | Corsini ..................... 414/788.1 |
| 6,290,448 B1 | * | 9/2001 | Focke et al. ........... 414/222.01 |

* cited by examiner

Primary Examiner—Kathy Matecki
Assistant Examiner—Sang Kim
(74) Attorney, Agent, or Firm—Killworth, Gottman, Hagan & Schaeff, LLP

(57) ABSTRACT

A robotic order picking system employing a plurality of pedestal robots is provided. The robotic order picking system also employs a specialized transfer car including a pallet stacker. In accordance with one embodiment of the present invention, a robotic order picking system is provided comprising a plurality of pallet stations, a conveyor network, a pedestal robot, and a robotic order assembly station. The pedestal robot and the conveyor network are arranged to define product transfer paths extending from respective ones of the plurality of pallet stations to the robotic order assembly station.

28 Claims, 2 Drawing Sheets

ROBOTIC ORDER PICKING SYSTEM

CROSS-REFERENCE TO RELATED APPLICATIONS

The present application claims the benefit of U.S. Provisional Application Ser. No. 60/168,923 for ROBOTIC ORDER PICKING SYSTEM, filed Dec. 3, 1999.

BACKGROUND OF THE INVENTION

The present invention relates to order picking systems and, more particularly, to a robotic order picking system employing a plurality of pedestal robots and, according to one embodiment of the present invention, to a transfer car including a pallet stacker. The present invention is well-suited for use as an order picking system for a variety of products including, but not limited to, packaged beverage products. For the purposes of defining and describing the present invention it is noted that a "pallet" as recited herein denotes any type of load building device or load carrier including, but not limited to, conventional wooden, fiberboard, or plastic pallets, supportive sheets, trolleys, shuttles, etc.

BRIEF SUMMARY OF THE INVENTION

This need is met by the present invention wherein a robotic order picking system employing a plurality of pedestal robots is provided. The robotic order picking system also employs a specialized transfer car including a pallet stacker. In accordance with one embodiment of the present invention, a robotic order picking system is provided comprising a plurality of pallet stations, a conveyor network, a pedestal robot, and a robotic order assembly station. The pedestal robot and the conveyor network are arranged to define product transfer paths extending from respective ones of the plurality of pallet stations to the robotic order assembly station.

The plurality of pallet stations typically include pick stations positioned within an operating envelope of the pedestal robot and the pick stations and the operating envelope are fixed relative to one another. The operating envelope of the pedestal robot may be fixed in a horizontal plane of the robotic order picking system. Alternatively, one or more of the pedestal robots may be mounted on a shuttle to permit movement in the horizontal plane of the robotic order picking system.

The pallet stations may include pick-up and delivery stations and pick stations and the robotic order picking system may comprise a transfer car arranged to move a product and an associated pallet from one of the pick-up and delivery stations to one of the pick stations. The pallet stations may further include back stock stations and the transfer car may be arranged to move a product and an associated pallet between the back stock stations, the pick-up and delivery stations, and the pick stations. The transfer car may include a pallet stacker and may be arranged to receive respective empty pallets from the pick stations and to stack and retain a plurality of the empty pallets in the pallet stacker.

The conveyor network typically defines independent conveying paths, each being accessible by the pedestal robot and each defining a portion of one of the product transfer paths.

The pedestal robot is typically arranged to remove a selected product from a pallet in one of the pallet stations and to transfer the selected product to a selected conveyor in the conveyor network. The pallet stations typically include pick stations within an operating envelope of the pedestal robot and the pedestal robot is typically arranged to remove a selected product from a pallet in one of the pick stations and to transfer the selected product to a selected conveyor in the conveyor network.

The robotic order assembly station may be arranged to transfer products from the conveyor network to a selected pallet and may be programmed to assemble a specific collection of products on selected pallets as a function of a specific product order.

The robotic order picking system may comprise an automated controller provided to enable selection and packing of appropriate products from a product stock and a product identification station in communication with the automated controller and arranged to identify products to be placed in the pallet stations. The automated controller, which may be a PLC, a computer, a networked computer, etc., may comprise a robot and transfer car controller programmed to enable selection, transfer, and picking of an ordered product. The automated controller may also comprise a conveyor controller programmed to enable conveyance of an ordered product to the order assembly station and an order assembly station controller programmed to enable matching of the ordered product with additional products associated with a common order.

In accordance with another embodiment of the present invention, a robotic order picking system is provided comprising a plurality of pallet stations, a transfer car, a conveyor network, a pedestal robot, and a robotic order assembly station. The pallet stations include pick-up and delivery stations and pick stations. The transfer car is arranged to move a product and an associated pallet from one of the pick-up and delivery stations to one of the pick stations. The pedestal robot is arranged to remove a selected product from a pallet in one of the pick stations and to transfer the selected product to a selected conveyor in the conveyor network. The robotic order assembly station is arranged to transfer products from the conveyor network to an order pallet.

In accordance with yet another embodiment of the present invention, a robotic order picking system is provided comprising a plurality of pallet stations, first and second transfer cars, a conveyor network, a pedestal robot, and a robotic order assembly station. The plurality of pallet stations include first and second rows of pickup and delivery stations and first and second rows of pick stations. The first transfer car is arranged to move along a first path between the first row of pick-up and delivery stations and the first row of pick stations, and move a product and an associated pallet from one of the pick-up and delivery stations in the first row of pick-up and delivery stations to one of the pick stations in the first row of pick stations. Similarly, the second transfer car is arranged to move along a second path between the second row of pickup and delivery stations and the second row of pick stations, and move a product and an associated pallet from one of the pick-up and delivery stations in the second row of pick-up and delivery stations to one of the pick stations in the second row of pick stations. The conveyor network defines a conveyor path extending between the first and second rows of pick stations. The pedestal robot is arranged to remove a selected product from a pallet in one of the pick stations and to transfer the selected product to a selected conveyor along the conveyor path in the conveyor network. An operating envelope of the pedestal robot includes pick stations in the first and second rows of pick stations. The robotic order assembly station is arranged to transfer products from the conveyor network to an order pallet.

The plurality of pallet stations may further include back stock stations and the transfer cars may be arranged to move a product and an associated pallet between the back stock stations, the pick-up and delivery stations, and the pick stations. The back stock stations may be positioned in the first and second rows of pick-up and delivery stations or in the first and second rows of pick stations. The transfer car may include a pallet stacker.

In accordance with yet another embodiment of the present invention, an integrated transfer car is provided comprising a transfer car chassis, a pallet load/unload portion, and a pallet stacker. The pallet load/unload portion is mechanically coupled to the chassis and is arranged to enable transfer of stocked pallets to and from the pallet load/unload portion. The pallet stacker is also mechanically coupled to the chassis and is arranged to receive, stack, and retain a plurality of empty pallets therein.

Accordingly, it is an object of the present invention to provide an improved robotic order picking system employing a plurality of pedestal robots. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
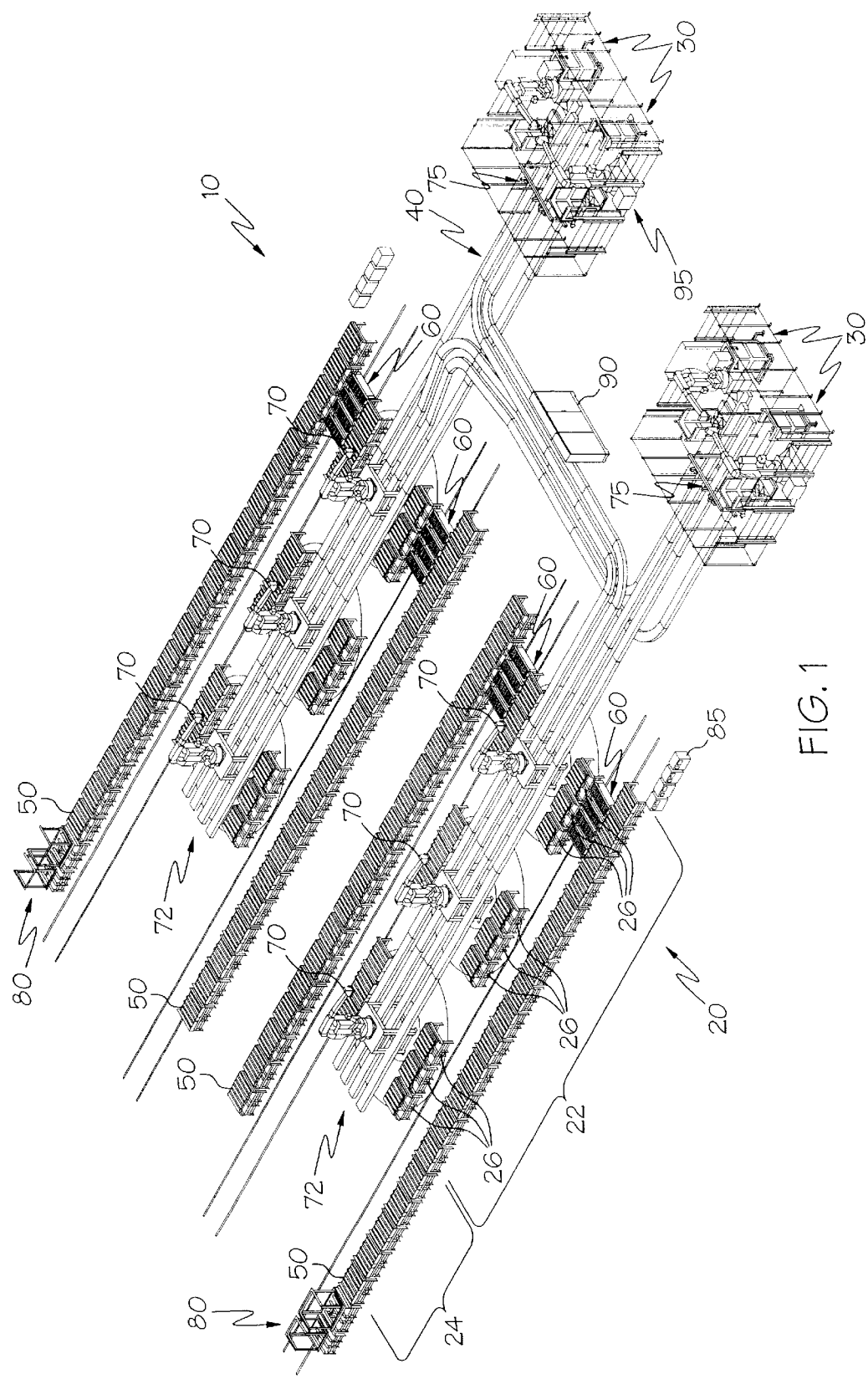
FIG. 1 is a schematic illustration of a robotic order picking system according to a first embodiment of the present invention.

As is illustrated in FIG. 1, the robotic order picking system 10 of one embodiment of the present invention comprises a plurality of pallet stations 20 linked to a pair of robotic order assembly stations 30 via a dedicated conveyor network 40. Specific products (not shown) positioned on pallets 50 are transferred from selected pallet stations 20 to the conveyor network 40 with the aid of selected multi-bed transfer cars 60, pedestal robots 70, and pallet stackers 80. Products are transferred from the dedicated conveyor network 40 to a specific order pallet with the aid of the robotic order assembly stations 30. It is noted that safety barriers similar to the one enclosing the robotic order assembly stations 30 are ordinarily provided about the remainder of the system 10 but have not been included in the illustrations of FIGS. 1 and 2 to preserve clarity.

For the purposes of defining and describing the present invention it is noted that a "pallet" as recited herein denotes any type of load building device or load carrier including, but not limited to, conventional wooden, fiber-board, or plastic pallets, supportive sheets, trolleys, shuttles, etc.

In the embodiment of FIG. 1, the specific structure of the pallet stations 20, the robotic order assembly or build stations 30, the dedicated conveyor network 40, the pallets 50, the transfer cars 60, the pedestal robots 70, and the pallet stackers 80 are not the subject of the present invention and may be gleaned from conventional material handling technology in light of the particular requirements of the specific order picking system application. A suitable pedestal robot 70, for example, is available from Motoman, Inc. of West Carrollton, Ohio, a Yaskawa company, under the product identifier SP100X or SP100-50. These Motoman robots may also be used in the robotic order assembly stations 30. Typically, system design requirements are primarily a function of the nature of products to be handled, the environment in which products are to be handled, the speed at which products must be handled, etc.

The overall structure of the illustrated robotic order picking system 10 is illustrated in FIG. 1. Specific reference is made to the utilization of pedestal robots 70 in transferring products from pallets 50 in selected pallet stations 20 to the robotic order assembly stations 30. For the purposes of defining and describing the present invention, it is noted that the pedestal robot arrangement of the present invention differs from conventional gantry-type robot arrangements where a continuous path, Cartesian-coordinate robot is constructed in a bridge shape and uses rails to move along a single horizontal axis or two perpendicular horizontal axes. Typically, the pedestal robots 70 are capable of movement through at least four and typically six degrees of freedom.

Figure 2:
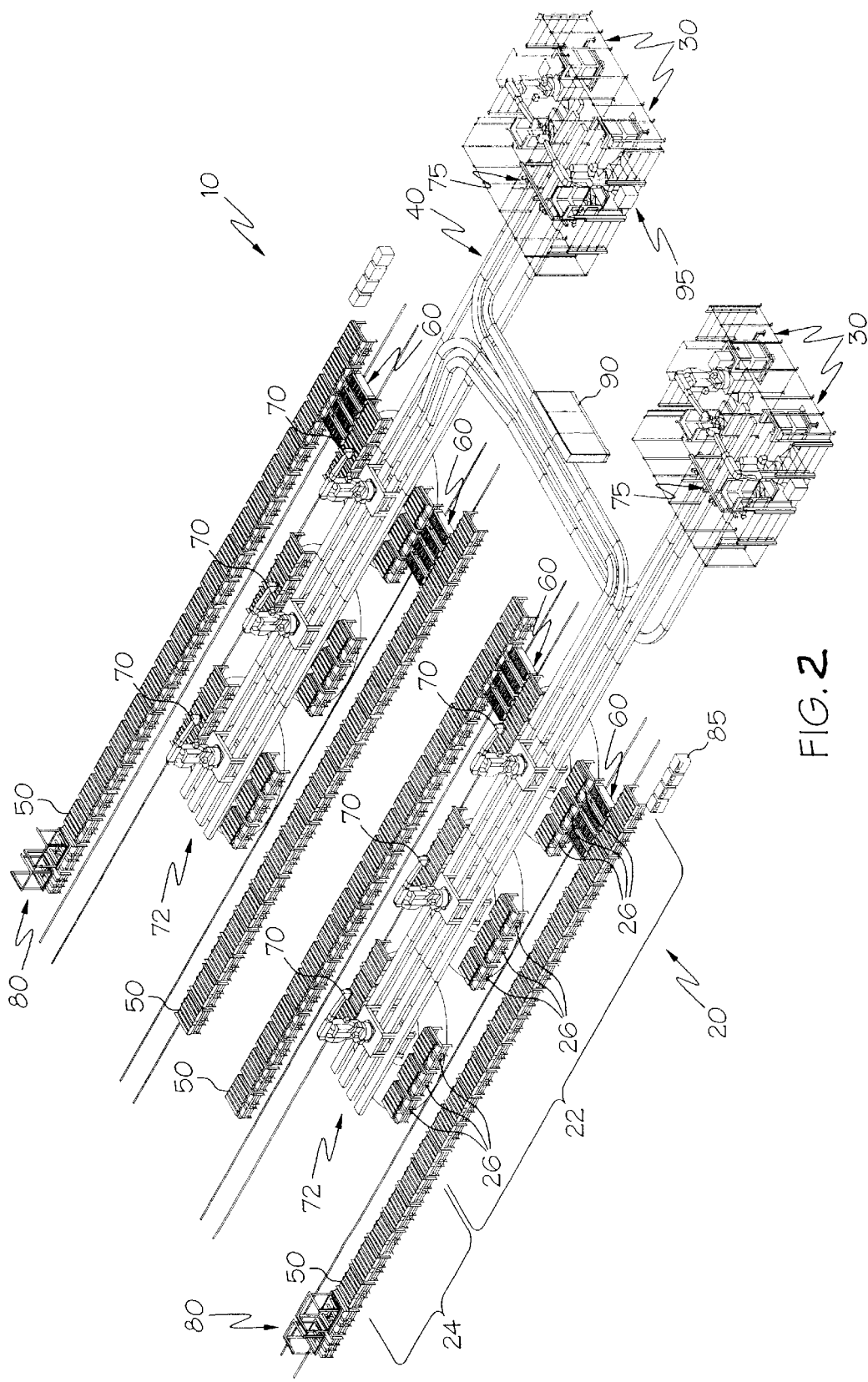
FIG. 2 is a schematic illustration of a robotic order picking system according to a second embodiment of the present invention.

Products are initially scanned at a product identification station 75 (see FIG. 2) and loaded on pallets in selected pallet stations 20. Downstream product identification stations 75 are also provided and are illustrated in FIGS. 1 and 2. Products may be positioned in one of a plurality of pick-up and delivery stations 22 through conventional stock delivery mechanisms. The product and its associated pallet 50 may be subsequently moved to a back stock station 24 or a pick station 26 with the aid of one of the transfer cars 60. Pick stations 26 are designated according to their proximity to the robots 70. Typically, any pallet station 20 within the operating envelope of one of the robots 70 is designated a pick station 26. Empty pallets are routed to a selected stationary pallet stacker 80 with the aid of one of the transfer cars 60. A suitable pallet stacker 80 is arranged to receive empty pallets from a transfer car 60.

As will be appreciated by those practicing the present invention and familiar with materials handling technology, the transfer cars 60 and the pallet stations 20 are designed to enable movement of a pallet 50 between a selected transfer car 60 and a selected pallet station 20. Conventional pallet stackers and transfer cars typically include motive mechanisms for initiating movement of a pallet held thereon in the direction of an associated conveyor, stacker, or transfer car. Similarly, conventional pallet stackers and transfer cars typically include mechanisms for receiving a pallet moving in its direction.

The pedestal robots 70 and the conveyor network 40 are arranged to define a product transfer path extending from respective pick stations 26 to the robotic order assembly stations 30. Specifically, the pedestal robots 70 operate to remove products from pallets 50 in the pick stations 26 and transfer the products to a selected conveyor of the dedicated conveyor network 40. As is illustrated in FIG. 1, each conveyor of the conveyor network 40 is dedicated to a specific position within one of the robotic order assembly stations 30. The order assembly station 30 is programmed to assemble a specific collection of products on selected pallets as a function of a specific product order. The operating system software is arranged to enable selection of specific products from the corresponding pallet stations 20. If necessary, pallets containing selected products are moved to a pick station 26. A corresponding pedestal robot 70 removes the selected product from the pallet 50 in the pick station 26 and transfers the product to a selected conveyor. It is contemplated that one or more of the pedestal robots 70 may be mounted on a shuttle to permit movement in the horizontal plane of the robotic order picking system 10. The picked product is routed to a specific robotic order assembly station 30 via the conveyor.

The embodiment of the present invention illustrated in FIG. 2 is similar in many respects to the embodiment of FIG. 1. The embodiment of FIG. 2, however, includes an integrated transfer car 60', as opposed to a conventional transfer car 60. The integrated transfer car 60' comprises a transfer car chassis, a pallet load/unload portion 61 mechanically coupled to the chassis, and a pallet stacker 62 mechanically coupled to the chassis. The integrated transfer car 60' is particularly advantageous because it incorporates the pallet stacker 62, the structure of which is similar to the pallet stacker 80 illustrated in FIG. 1 with the exception that the pallet stacker 62 moves with the rest of the integrated transfer car 60' and is capable of loading empty pallets from one of the pick stations 26. Empty pallets 50 may be loaded directly onto the pallet stacker 62. In this manner, it is not necessary to move individual empty pallets to the remote pallet stack 80. Rather, a plurality of empty pallets are routed to a selected stationary pallet stack 80 with the aid of one of the transfer cars 60 when the pallet stacker 62 reaches its capacity.

Further, the pallet station arrangement of the FIG. 2 embodiment is more condensed than that of the FIG. 1 embodiment because it incorporates additional back stock stations 24 between respective pick stations 26. Finally, FIG. 2 illustrates a plurality of bi-directional shuttles 42 which are arranged to move products from a robot drop-off position to a selected conveyor of the dedicated conveyor network 40. The specific structure of the bi-directional shuttles 42 is not the object of the present invention and may be gleaned from conventional object handling and conveying technology.

In certain embodiments of the present invention it may also be preferable to provide one or more of the pedestal robots 70 with a vision system 72 to enhance the product location and identification functions of the system 10.

As is illustrated in FIGS. 1 and 2, suitable automated controllers, which may be PLCs, computers, networked computers, etc., are provided to enable selection and packing of appropriate products from the product stock. Specifically, once the product identity has been recorded by the product identification station 75, it is preferable to program the robot and transfer car controllers 85 to select, transfer, and pick an ordered product. In addition, the conveyor controller 90 should be programmed to convey the ordered product to the order assembly station 30 and the order assembly station controller 95 is preferably programmed to match the ordered product with any additional products associated with a common order and package the product order on one or more pallets or in one or more shipping containers. In FIGS. 1 and 2, separate conveyor, robot, transfer car, and assembly station controllers are illustrated. However, it is contemplated that the functions of one or more of these individual controllers may be incorporated into a single integrated controller.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A robotic order picking system comprising:
   a plurality of pallet stations;
   a conveyor network;
   a pedestal robot; and
   a robotic order assembly station, wherein
      said pedestal robot and said conveyor network are arranged to define product transfer paths extending from respective ones of said plurality of pallet stations to said robotic order assembly station;
      said plurality of pallet stations include pick-up and delivery stations and pick stations and wherein said robotic order picking system comprises a transfer car arranged to move a product and an associated pallet from one of said pick-up and delivery stations to one of said pick stations; and
      said transfer car includes a pallet stacker.

2. A robotic order picking system as claimed in claim 1 wherein said plurality of pallet stations further include back stock stations and wherein said transfer car is arranged to move a product and an associated pallet between said back stock stations, said pick-up and delivery stations, and said pick stations.

3. A robotic order picking system as claimed in claim 1 wherein said transfer car is arranged to receive respective empty pallets from said pick stations and to stack and retain a plurality of said empty pallets in said pallet stacker.

4. A robotic order picking system comprising:
   a plurality of pallet stations;
   a conveyor network;
   a pedestal robot; and
   a robotic order assembly station, wherein
      said pedestal robot and said conveyor network are arranged to define product transfer paths extending from respective ones of said plurality of pallet stations to said robotic order assembly station;
      said plurality of pallet stations include pick stations positioned within an operating envelope of said pedestal robot and wherein said pick stations and said operating envelope are fixed relative to one another; and
      said pedestal robot is arranged to remove a selected product from a pallet in one of said pallet stations and to transfer said selected product to a selected conveyor in said conveyor network.

5. A robotic order picking system as claimed in claim 4 wherein said operating envelope of said pedestal robot is fixed in a horizontal plane of said robotic order picking system.

6. A robotic order picking system as claimed in claim 4 wherein said conveyor network defines independent conveying paths and wherein each of said independent conveying paths is accessible by said pedestal robot.

7. A robotic order picking system as claimed in claim 6 wherein each of said independent conveying paths defines a portion of one of said product transfer paths.

8. A robotic order picking system as claimed in claim 4 further comprising a plurality of bi-directional shuttles arranged to move products from a robot drop-off position to said selected conveyor.

9. A robotic order picking system as claimed in claim 4 wherein said robotic order assembly station is arranged to transfer products from said conveyor network to a selected pallet.

10. A robotic order picking system as claimed in claim 9 wherein said robotic order assembly station is further programmed to assemble a specific collection of products on selected pallets as a function of a specific product order.

11. A robotic order picking system as claimed in claim 4 further comprising a product identification station arranged to identify products to be placed in said pallet stations.

12. A robotic order picking system as claimed in claim 4 wherein said pedestal robot is arranged to move through at least four degrees of freedom.

13. A robotic order picking system as claimed in claim 4 wherein said pedestal robot is arranged to move through at least six degrees of freedom.

14. A robotic order picking system as claimed in claim 4 wherein said pedestal robot is arranged to move in a horizontal plane of said robotic order picking system.

15. A robotic order picking system comprising:
a plurality of pallet stations;
a conveyor network;
a pedestal robot; and
a robotic order assembly station, wherein
said pedestal robot and said conveyor network are arranged to define product transfer paths extending from respective ones of said plurality of pallet stations to said robotic order assembly station;
said plurality of pallet stations include pick stations positioned within an operating envelope of said pedestal robot and wherein said pick stations and said operating envelope are fixed relative to one another: and
said plurality of pallet stations include pick stations within an operating envelope of said pedestal robot and wherein said pedestal robot is arranged to remove a selected product from a pallet in one of said pick stations and to transfer said selected product to a selected conveyor in said conveyor network.

16. A robotic order picking system as claimed in claim 15 wherein said operating envelope of said pedestal robot is fixed in a horizontal plane of said robotic order picking system.

17. A robotic order picking system as claimed in claim 15 wherein said conveyor network defines independent conveying paths and wherein each of said independent conveying paths is accessible by said pedestal robot.

18. A robotic order picking system as claimed in claim 15 wherein said robotic order assembly station is arranged to transfer products from said conveyor network to a selected pallet.

19. A robotic order picking system as claimed in claim 15 further comprising a product identification station arranged to identify products to be placed in said pallet stations.

20. A robotic order picking system as claimed in claim 15 wherein said pedestal robot is arranged to move through at least four degrees of freedom.

21. A robotic order picking system as claimed in claim 15 wherein said pedestal robot is arranged to move through at least six degrees of freedom.

22. A robotic order picking system as claimed in claim 15 wherein said pedestal robot is arranged to move in a horizontal plane of said robotic order picking system.

23. A robotic order picking system comprising:
a plurality of pallet stations including first and second rows of pick-up and delivery stations and first and second rows of pick stations;
a first transfer car arranged to
move along a first path between said first row of pick-up and delivery stations and said first row of pick stations, and
move a product and an associated pallet from one of said pick-up and delivery stations in said first row of pick-up and delivery stations to one of said pick stations in said first row of pick stations;
a second transfer car arranged to
move along a second path between said second row of pick-up and delivery stations and said second row of pick stations, and
move a product and an associated pallet from one of said pick-up and delivery stations in said second row of pick-up and delivery stations to one of said pick stations in said second row of pick stations;
a conveyor network defining a conveyor path extending between said first and second rows of pick stations;
a pedestal robot arranged to remove a selected product from a pallet in one of said pick stations and to transfer said selected product to a selected conveyor along said conveyor path in said conveyor network, wherein an operating envelope of said pedestal robot includes pick stations in said first and second rows of pick stations; and
a robotic order assembly station arranged to transfer products from said conveyor network to an order pallet.

24. A robotic order picking system as claimed in claim 23 wherein said plurality of pallet stations further include back stock stations and wherein said transfer cars are arranged to move a product and an associated pallet between said back stock stations, said pick-up and delivery stations, and said pick stations.

25. A robotic order picking system as claimed in claim 24 wherein said back stock stations are positioned in said first and second rows of pick-up and delivery stations.

26. A robotic order picking system as claimed in claim 24 wherein said back stock stations are positioned in said first and second rows of pick stations.

27. A robotic order picking system as claimed in claim 23 wherein said transfer car includes a pallet stacker.

28. A robotic order picking system comprising:
a plurality of pallet stations including pick-up and delivery stations and pick stations;
a transfer car arranged to move a product and an associated pallet from one of said pick-up and delivery stations to one of said pick stations;
a conveyor network;
a pedestal robot arranged to remove a selected product from a pallet in one of said pick stations and to transfer said selected product to a selected conveyor in said conveyor network; and
a robotic order assembly station arranged to transfer products from said conveyor network to an order pallet.

* * * * *